(12) United States Patent
Feng

(10) Patent No.: US 9,550,314 B2
(45) Date of Patent: Jan. 24, 2017

(54) FLOTATION TYPE SYSTEM AND METHOD FOR CRUSHING, SEPARATING AND WASHING WASTE PLASTICS

(71) Applicant: Yubin Feng, Guangdong (CN)

(72) Inventor: Yubin Feng, Guangdong (CN)

( * ) Notice: Subject to any disclaimer, the term of this patent is extended or adjusted under 35 U.S.C. 154(b) by 441 days.

(21) Appl. No.: 14/165,146

(22) Filed: Jan. 27, 2014

(65) Prior Publication Data

US 2014/0209715 A1 Jul. 31, 2014

(30) Foreign Application Priority Data

Jan. 31, 2013 (CN) .......................... 2013 1 0039088

(51) Int. Cl.
| | |
|---|---|
| *B02C 23/00* | (2006.01) |
| *B29B 17/02* | (2006.01) |
| *B02C 23/10* | (2006.01) |
| *B02C 23/06* | (2006.01) |

(52) U.S. Cl.
CPC ............... *B29B 17/02* (2013.01); *B02C 23/06* (2013.01); *B02C 23/10* (2013.01); *B29B 2017/0244* (2013.01); *B29B 2017/0289* (2013.01); *Y02W 30/524* (2015.05); *Y02W 30/622* (2015.05)

(58) Field of Classification Search
CPC ............ B29B 17/02; B29B 2017/0213; B29B 2017/0217; B29B 2017/0244; Y02W 30/622; Y02W 30/524; B02C 23/00; B02C 23/06; B02C 23/10
USPC .............. 241/20, 79.1; 209/3, 155, 162, 164
See application file for complete search history.

(56) References Cited

U.S. PATENT DOCUMENTS

| | | | | |
|---|---|---|---|---|
| 5,255,859 A | * | 10/1993 | Peacock | B03B 9/061 134/107 |
| 5,397,066 A | * | 3/1995 | Leitman | B03B 4/00 209/127.1 |
| 5,667,151 A | * | 9/1997 | Miura | B03B 5/28 241/20 |
| 5,894,996 A | * | 4/1999 | Williams | B03B 5/28 209/172 |

(Continued)

FOREIGN PATENT DOCUMENTS

| | | |
|---|---|---|
| CN | 102285109 | 12/2011 |
| CN | 202668795 | 1/2013 |

(Continued)

*Primary Examiner* — Faye Francis
(74) *Attorney, Agent, or Firm* — Colin P. Cahoon; Shaukat A. Karjeker; Carstens & Cahoon, LLP

(57) ABSTRACT

Provided are flotation system and method for crushing, separating and washing waste plastics. In a direction of transporting materials, the flotation system includes a crusher, a flotation tank, a multi-functional rubbing and separating device, a washing tank and a dehydrator which are connected in turn; the flotation tank and the washing tank are disposed abreast; the floatation tank is a straight launder, and the washing tank is a U-shaped launder; and the discharge port of the flotation tank and the feeding port of the washing tank are connected via the multi-functional rubbing and separating device. The method is to crush the waste plastics first and then execute multiple stages of washing and separating. The flotation system and method herein are capable of improving the effect of washing waste plastics effectively and improving the quality of products.

15 Claims, 6 Drawing Sheets

(56) References Cited

U.S. PATENT DOCUMENTS

| | | | | |
|---|---|---|---|---|
| 5,902,976 | A * | 5/1999 | Beasley | B03B 5/28 |
| | | | | 209/164 |
| 6,422,393 | B1 * | 7/2002 | Van Jahnke | B03D 1/02 |
| | | | | 209/164 |
| 6,568,410 | B1 | 5/2003 | Teruggi et al. | |
| 6,884,347 | B1 * | 4/2005 | Krieger | C02F 1/24 |
| | | | | 210/201 |
| 8,393,558 | B2 * | 3/2013 | Gitschel | B03B 9/06 |
| | | | | 241/19 |

FOREIGN PATENT DOCUMENTS

| | | |
|---|---|---|
| CN | 103112101 | 5/2013 |
| CN | 203125773 | 8/2013 |

\* cited by examiner

FLOTATION TYPE SYSTEM AND METHOD FOR CRUSHING, SEPARATING AND WASHING WASTE PLASTICS

CROSS-REFERENCE TO RELATED APPLICATIONS

This application claims priority to Chinese Application No. 201310039088.3, "FLOTATION SYSTEM AND METHOD FOR CRUSHING, SEPARATING AND WASHING WASTE PLASTICS", filed on Jan. 31, 2013, which is hereby incorporated by reference in its entirety.

TECHNICAL FIELD

The present disclosure relates to the technical field of waste plastics recycling, and more particularly to a flotation system and method for crushing, separating and washing waste plastics.

BACKGROUND ART

Equipment for crushing, separating and washing waste plastics is commonly used in the field of waste plastics recycling, and due to lower gross profit rate of this industry, it is difficult to apply higher-priced production and process control equipment. In current equipment for crushing, separating and washing waste plastics, static fluid medium is commonly applied, and fragments of the waste plastics floating on surface of the fluid medium are mechanically stirred to realize the purpose of washing and separating. However, the prior art method herein has disadvantages of lower efficiency, incomplete separation, and higher water consumption.

SUMMARY OF THE INVENTION

In view of defects existing in the prior art mentioned above, in one aspect, the present disclosure provides a flotation system for crushing, separating and washing waste plastics, wherein, by means of applying fluid medium, fragments of the waste plastics are driven to move, and in the entire washing process, multiple means such as turbulent flow, plug flow, throwing and striking and so on are applied by the fluid medium to the fragments at one time or another, thereby improving the separating effect and separating speed, and improving the quality of products.

The flotation system for crushing, separating and washing waste plastics, in a direction of transporting materials, includes a crusher, a flotation tank, a multi-functional rubbing and separating device, a washing tank and a dehydrator which are connected in turn;

wherein, the flotation tank and the washing tank are disposed abreast;

the flotation tank is a straight launder;

the washing tank includes a tank-body and a division plate; the tank-body is a U-shaped box, one end of the tank-body is a curve end, and the other end of the tank-body is a flat end, and the division plate is disposed at an intermediate position inside the tank-body; one end of the division plate is fixedly connected to the flat end of the tank-body, and a third flow channel is disposed between the other end of the division plate and the curve end of the tank-body, so that a first flow channel on one side of the division plate, a second flow channel on the other side of the division plate and the third flow channel form a continuous U-shaped washing flow channel.

Both of the feeding port and discharge port of the washing tank are disposed on the flat end of the tank-body, and respectively disposed at two sides of the division plate. The entire U-shaped washing flow channel starts from the flat end of the washing tank at one side of the division plate; materials firstly pass the first flow channel at one side of the division plate, then pass the third flow channel between the end of the division plate and the curve end of the washing tank, and then pass the second flow channel at the other side of the division plate, finally the materials are sent out from the discharge port on the flat end of the washing tank at the other side of the division plate. The total length of the flow channels can be set according to actual processing requirements. The washing tank having the structure herein can effectively shorten the length of equipment for washing process, so that the entire flotation system for crushing, separating and washing waste plastics is more compact in equipment structure.

A discharge port of said flotation tank is disposed on one end of said flotation tank approximate to said flat end of said tank-body, the feeding port of said flotation tank is disposed on another end of said flotation tank; and the discharge port of the flotation tank and the feeding port of said washing tank are connected via said multi-functional rubbing and separating device; the feeding port of said flotation tank connects with said crusher, and the discharge port of said washing tank connects with said dehydrator.

A collecting and recycling system may be disposed under the dehydrator of the flotation system, thereby effectively reducing the consumption of the fluid medium.

According to actual situation of equipment, the washing tank may either be a straight flow channel. However, the washing tank with U-shaped flow channel can effectively shorten the length of equipment for washing process, so that the entire flotation system for crushing, separating and washing waste plastics is more compact in equipment structure.

Preferably, the flotation tank and/or washing tank are respectively equipped with at least one boost straightening device;

Wherein the boost straightening device includes a straightening roller, radial diversion vanes and axial diversion vanes; the radial diversion vanes and axial diversion vanes are cross distributed on the outer cylindrical surface of the straightening roller. The straightening roller is a closed hollow cylinder with a roller rotating axle disposed in the central part thereof, the radial diversion vane is a vertical baffle radially disposed on the outer cylindrical surface of the straightening roller, and the axial diversion vane is an arc-shaped baffle axially disposed on the outer cylindrical surface of the straightening roller. When using, simply install the boost straightening device on the flotation tank or the washing tank; the central axis of the boost straightening device is perpendicular to the flow direction of the fluid in the flow channels, the quantity of boost straightening devices can be set flexibly according to actual requirements. The working principle of the boost straightening device herein is as follows: when the straightening roller is rotating, the lowest point of the outer cylindrical surface is lower than the fluid surface in the flow channels, therefore, the fluid and fragments of waste plastics contained therein will be pushed downwards to a certain water level, so as to reduce the rising distance of the floating materials and the settling distance of the sinking materials; wherein, the function of the axial diversion vanes distributed on the straightening roller is to push materials downwards, so that the materials will not billow out but will flow smoothly with the fluid medium; the function of the radial diversion vanes distributed on the straightening roller is to convert the fluid flow from the status of turbulent flow to the status of plug flow, thereby avoiding the materials going up and down with the fluid medium to reduce the effect of flotation separating.

Preferably, the flotation tank and/or washing tank are equipped with at least one beater;

Wherein the beater includes a beater rotating axle and multiple rotating blades, the multiple rotating blades are uniformly distributed on the outer cylindrical surface of the beater rotating axle, and each of rotating blades is disposed axially along the central axis of the beater rotating. When a using, simply install the beater on the flotation tank or the washing tank; the central axis of the beater is perpendicular to the flow direction of the fluid in flow channel, according to actual requirements, the quantity of the beaters also can be set up flexibly. When the beater is working, the rotating axle of the beater drives rotating blades to rotate, flapping materials in the flotation tank or the washing tank, so as to overcome the surface tension between fragments of the waste plastics, thereby achieving the effect of separating impurities from fragments of waste plastics effectively and accelerating the separating speed of the materials in fluid medium.

The crusher and the feeding port of the flotation tank are connected through a screw conveyor; alternatively, the crusher is high placed to form a gravity self-falling mechanism, so that the crushed fragments of the waste plastics fall in the flotation tank automatically.

Preferably, the multi-functional rubbing and separating device includes a main body, a rotating axle of the device and lapping blades; a feeding port is disposed on one end of the main body and a discharge port is disposed on the other end; the rotating axle and lapping blades are disposed inside the main body; and the lapping blades are distributed on outer cylindrical surface of the rotating axle; inner space of the main body close to the feeding port forms a rubbing section, and inner space close to the discharge port forms a separating and dehydrating section; the main body is a hollow cylinder with both ends closed, and there are multiple through-holes distributed on the sidewall of the main body. The external rotary driving mechanism, connected to the multi-functional rubbing and separating device, drives the rotating axle to drive the lapping blades to rotate at a high speed, after the materials, containing waste plastics and fluid medium which may be water and saline and so on, are transported into the main body from the feeding port, along with the high-speed revolution of the lapping blades, the impurities attaching on the surface of the waste plastics are separated preliminarily in the rubbing section, and in the separating dehydration section, after the materials are flapped by the lapping blades, the impurities are thrown, along with the fluid medium, out of the main body through through-holes. The waste plastics, because of the kinetic energy provided by the lapping blades, will bounce off the discharge port of the multi-functional rubbing and separating device.

Preferably, a material limiting device is disposed between the flotation tank and the multi-functional rubbing and separating device. The material limiting device includes a material transporting pipe and an impeller; the material transporting pipe (which may either be a material transporting trough) is disposed at the feeding port of the multi-functional rubbing and separating device, the impeller is disposed inside the material transporting pipe, the axial central axis of the impeller is perpendicular to the central axis of the material transporting pipe, and the central axle of the impeller connects with an external impeller driving mechanism. Blades on the impeller divide the cross-section of the material transporting pipe into multiple relatively independent spaces; after being fed into the material transporting pipe, the materials are distributed, at the impeller, into every relatively independent spaces; along with rotation of the impeller, materials in every relatively independent spaces are transported into the feeding port of the rubbing and separating device. Since the materials are fed into the feeding port of the rubbing and separating device uniformly in batches, the material feeding flow is uniform, thereby avoiding the multi-functional rubbing and separating device being blocked due to over-load materials.

Preferably, the dehydrator is a vertical dehydrator, and a cyclone separator (namely, the thick/thin piece separator) is connected in the discharge port of the dehydrator;

The cyclone separator includes a rotary cyclone separating body and a discharge pipe disposed on the top of the cyclone separating body for discharging thin pieces; a material-air feeding pipe connected to the discharge port of the dehydrator is disposed on the upper part of the cyclone separating body, blowing direction of the material-air feeding pipe is tangent to an inner wall of the cyclone separating body, and a material-air feeding port is formed on a wall of the cyclone separating body; a discharge port for thick pieces is disposed on the bottom of the cyclone separating body; the discharge pipe extends inside the cyclone separating body from a head cover of the cyclone separating body, and a lower end of the discharge pipe extends downward below the material-air feeding port. The thick/thin pieces (namely the pieces of the waste plastics being dehydrated by the dehydrator) are fed, with high air volume, from the material-air feeding pipe into the cyclone separating body to rotate at a high-speed; the thick pieces with smaller specific surface area, due to a higher centrifugal force being generated, are thrown to the inner wall of the cyclone separating body, and as the effect of gravity, the thick pieces sliding down to the bottom of the cyclone separating body are discharged out of the discharge port; the wind flow entering the cyclone separating body is discharged from the discharge pipe because of pressure difference, the thin pieces with larger specific surface area, overcoming the gravity due to the effect of wind force, are carried by the wind flow and discharged out of the discharge pipe, thereby achieving the effect of separating the thick pieces and thin pieces in the waste plastics, and collecting the thick pieces and thin pieces separately.

Preferably, a first circulating water mechanism is disposed between the flotation tank and multi-functional rubbing and separating device, and a second circulating water mechanism is disposed between the washing tank and the dehydrator. The first circulating water mechanism includes a circulating pipe disposed between the flotation tank and multi-functional rubbing and separating device, thereby, the flotation medium obtained after the processing by the multi-functional rubbing and separating device is conveyed back to the flotation tank for recycling utilization; the second circulating water mechanism includes a circulating pipe disposed between the washing tank and the dehydrator, thereby, the washing medium obtained after the processing by the dehydrator is conveyed back to the washing tank for recycling utilization. By means of applying the first circulating water mechanism and the second circulating water mechanism, the high quality control of the fluid medium is realized, which is capable of effectively reducing the consumption and wastage of the flotation medium and washing medium in the crushing, separating and washing processes for the waste plastics.

By means of the system mentioned above, a flotation method for crushing, separating and washing waste plastics is realized, which includes following steps:

(1) waste plastics are transported into the crusher of the flotation system to be crushed, so as to form fragments of the waste plastics which are transported to the flotation tank of the flotation system;

(2) there is fluid flotation medium pre-placed in the flotation tank, and after being fed into the flotation tank, the fragments of the waste plastics are separated primarily along with flowing of the flotation medium, thereby removing heavy impurities;

Wherein those fragments of waste plastics, of which specific gravity is less than specific gravity of the flotation medium, float upward and are transported to the multi-functional rubbing and separating device of the flotation system; while those fragments of waste plastics, of which specific gravity is heavier than the specific gravity of the flotation medium, and heavy impurities sink downward and remain in the flotation tank;

(3) after being fed to the multi-functional rubbing and separating device, the fragments of waste plastics are beaten and stirred by force for separation, thereby removing light impurities preliminarily, and then pieces separated are transported to the washing tank of the flotation system;

(4) there is fluid washing medium pre-placed in the washing tank, and after being fed into the washing tank, the pieces of the waste plastics are secondarily separated along with flowing of the washing medium, thereby further removing light impurities;

Wherein those pieces of waste plastics, of which specific gravity is less than specific gravity of the washing medium, float upward and are transported to the dehydrator of the flotation system; while those pieces of waste plastics, of which specific gravity is heavier than specific gravity of the washing medium, and light impurities sink downward and remain in the washing tank; and (5) the pieces of the waste plastics are fed into the dehydrator to be dried and dehydrated, so as to remove the washing medium attaching to surface thereof, thereby forming recycled pieces.

Preferably, in the step (1), said crusher crushes the waste plastics by means of dry-crushing or wet-crushing; wherein the dry-crushing is performed by crushing the waste plastics directly by the crusher without adding any fluid medium; and the wet-crushing is performed by crushing the waste plastics in a fluid medium environment by the crusher with the fluid medium added into the crusher simultaneously when the waste plastics are fed into the crusher;

In the step (2), the heavy impurities include metals and sediments contained in the fragments of the waste plastics, and the flotation medium is water or halide salt water;

And in the step (4), the light impurities include label paper, greasy dirt and flotation medium attaching on surface of the waste plastics; and the washing medium is water or halide salt water.

As compared to the prior art, the present disclosure has following advantages:

The working principle of the flotation method for crushing, separating and washing waste plastics herein is simple, which is to crush the waste plastics first and then execute multiple stages of washing and separating. The flotation system and method herein are capable of improving the effect of washing waste plastics effectively and improving the quality of products.

In the flotation system for crushing, separating and washing waste plastics, the washing tank is a U-shaped structure, which effectively shortens the length of equipment for washing process, so that the entire flotation system for crushing, separating and washing waste plastics is more compact in equipment structure, and the floor area of the equipment is reduced, which is beneficial to control the cost of the waste plastics recycling; and the feeding port and discharge port of the washing tank are disposed on the same end of the launder for further shortening the length of the entire equipment. Meanwhile, according to actual process requirements, the length or width of the launder can be set flexibly, and the material of the launder can be selected according to the process requirements as well; in addition, the washing tank with the U-shaped structure herein further may be as a launder unit, if the process requires, multiple launder units can be joined in use, which is simple in structure and convenient in use.

In the flotation system herein, boost straightening devices are added on both of the flotation tank and the washing tank, which are simple in structure and convenient in use. When using, simply install the boost straightening device on the flotation tank or the washing tank, and the quantity of boost straightening devices can be set flexibly according to the actual requirements. The boost straightening device can convert the fluid flow from the status of turbulent flow to the status of plug flow, thereby avoiding the materials going up and down with fluid, and achieving the effect of straightening; meanwhile, when the straightening roller is rotating, the fluid and fragments of waste plastics contained therein will be pushed downwards to a certain water level, so as to reduce the rising distance of the floating materials and the settling distance of the sinking materials. The combined effects herein can effectively improve the flotation speed or washing speed; shorten the flotation time or washing time and the length of the launder, so as to achieve the effect of high-efficient washing, and reducing the floor area of the equipment.

The crusher and the feeding port of the flotation tank are connected through a screw conveyor; alternatively, the crusher is high placed to form a gravity self-falling mechanism, so that the crushed fragments of the waste plastics fall in the flotation tank automatically. The working principle of the system herein is simple, and the feeding efficiency of the system herein is higher.

In the flotation system herein, a multi-functional rubbing and separating device is added between a flotation tank and a washing tank, which can effectively improve the quality of rubbing waste plastics, so as to separate waste plastics and impurities more thoroughly and improve the quality of recycled products. With the multi-functional rubbing and separating device herein, by means of high-speed revolution of the lapping blades, the lapping blades simultaneously agitate, flap and separate the materials, furthermore, the rubbing section, and separating and dehydrating section are arranged inside the main body, thereby achieving a rather good separating effect. The impurities such as label paper, greasy dirt, fluid medium from the flotation tank, and so on, attaching to the surface of the waste plastics can all be separated, therefore, after the materials enter the washing tank, the impurities thereof are reduced greatly, which can simplify the subsequent washing process.

A material limiting device is disposed between the flotation tank and the multi-functional rubbing and separating device. The material limiting device has advantages of simple structure, lower price and convenient in use; and the material limiting device, disposed between the material transporting mechanism and the mechanism for subsequent washing process, can control the feeding quantity of waste plastics washing mechanism to make the feeding flow uniform, thereby avoiding equipment for subsequent process being blocked due to over-load materials, and effectively improving the washing speed of waste plastics and improving the washing effect.

In the flotation system for crushing, separating and washing waste plastics, a cyclone separator is connected in the discharge port of the dehydrator; the cyclone separator is adopted to cyclone separate thick pieces and thin pieces in the dehydrated waste plastics, and after being separated, the thick pieces and thin pieces are respectively fed out from independent discharge pipes and then collected separately, thereby increasing the recovery rate of waste plastics, and avoiding the thin pieces floating in the air to pollute the environment.

BRIEF DESCRIPTION OF THE DRAWINGS

FIG. 5b is a cross-section view taken along A-A line of FIG. 5a;

PREFERRED EMBODIMENTS OF THE INVENTION

In order to make the purpose, technical solutions and advantages of the present disclosure to be understood more clearly, the present disclosure will be described in further details with the accompanying drawings and the following embodiments. It should be understood that the specific embodiments described herein are merely examples to illustrate the invention, not to limit the present disclosure.

Embodiments

Figure 1:
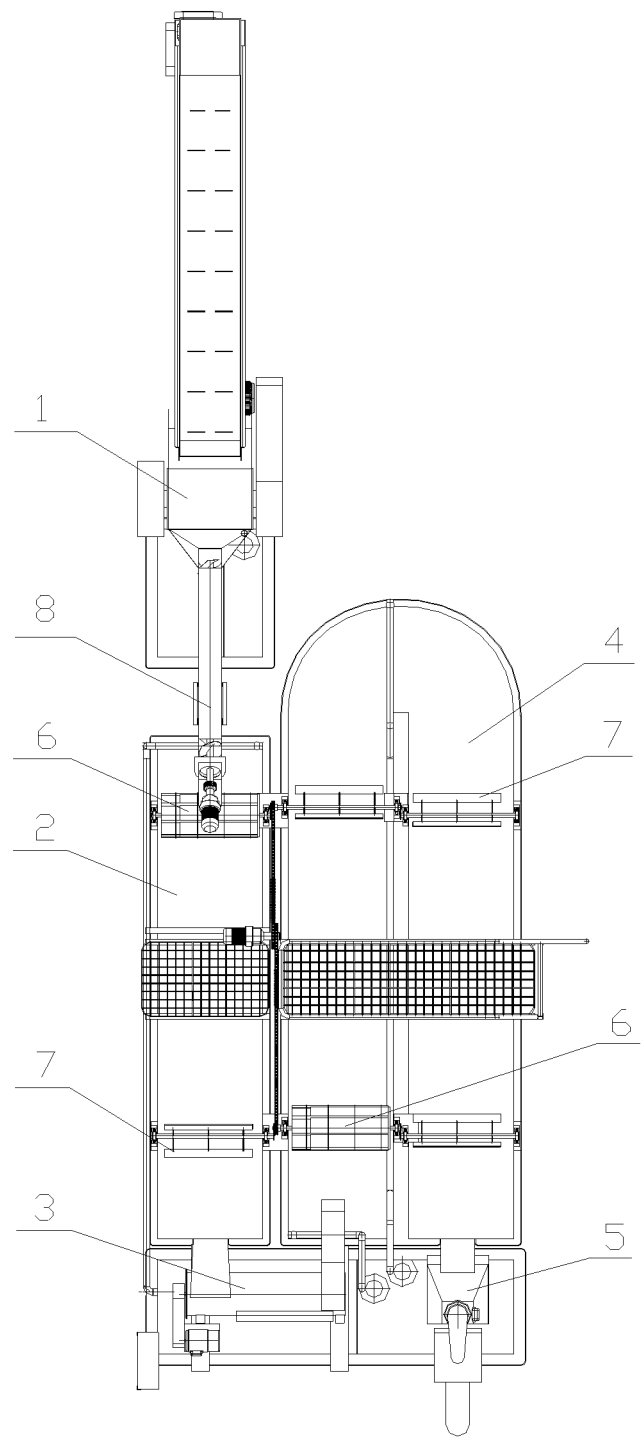
FIG. 1 is a structure diagram illustrating the flotation system for crushing, separating and washing waste plastics according to one embodiment of the present invention.

In one embodiment as shown in FIG. 1, the flotation system for crushing, separating and washing waste plastics, in a direction of transporting materials, comprises a crusher 1, a flotation tank 2, a multi-functional rubbing and separating device 3, a washing tank 4 and a dehydrator 5, which are connected in turn; the flotation tank 2 and the washing tank 4 are disposed abreast; the discharge port of the flotation tank 2 and the feeding port of the washing tank 4 are connected via the multi-functional rubbing and separating device 3.

The flotation tank 2 is a straight launder, and the washing tank 4 is a U-shaped launder.

Figure 2:
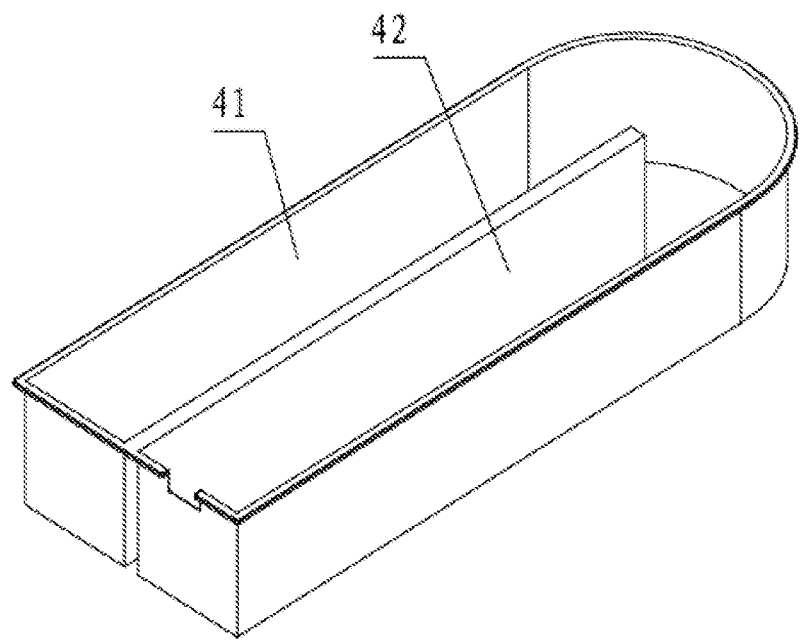
FIG. 2 is a structure diagram illustrating the washing tank of the flotation system for crushing, separating and washing waste plastics as shown in FIG. 1.

As shown in FIG. 2, The washing tank 4 includes a tank-body 41 and a division plate 42; the tank-body 41 is a U-shaped box, one end of the tank-body 41 is a curve end, and the other end of the tank-body 41 is a flat end, and the division plate 42 is disposed at the intermediate position inside the tank-body 41; one end of the division plate 42 is fixedly connected to the flat end of the tank-body 41, and a third flow channel is disposed between the other end of the division plate 42 and the curve end of the tank-body 41, so that a first flow channel on one side of the division plate 42, a second flow channel on the other side of the division plate 42 and the third flow channel form a continuous U-shaped washing flow channel. Both of the feeding port and discharge port of the washing tank 4 are disposed on the flat end of the tank-body 41, and respectively disposed at two sides of the division plate 42. The discharge port of the flotation tank 2 is disposed on one end of said flotation tank approximate to the flat end of said tank-body 41, and the feeding port of the flotation tank 2 is disposed on the other end of the flotation tank 2. The multi-functional rubbing and separating device 3 is disposed between the discharge port of the flotation tank 2 and the feeding port of the washing tank 4; the feeding port of the flotation tank 2 connects with the crusher 1, and the discharge port of the washing tank 4 connects with the dehydrator 5.

The entire U-shaped washing flow channel starts from the flat end of the washing tank 4 at one side of the division plate 42; materials firstly pass the first flow channel at one side of the division plate 42, then pass the third flow channel between the end of the division plate 42 and the curve end of the washing tank 4, and then pass the second flow channel at the other side of the division plate 42, finally the materials are sent out from the discharge port on the flat end of the washing tank 4 at the other side of the division plate 42. The total length of the flow channels can be set according to actual processing requirements. The washing tank 4 having the structure herein can effectively shorten the length of equipment for washing process, so that the entire flotation system for crushing, separating and washing waste plastics is more compact in equipment structure.

Figure 3:
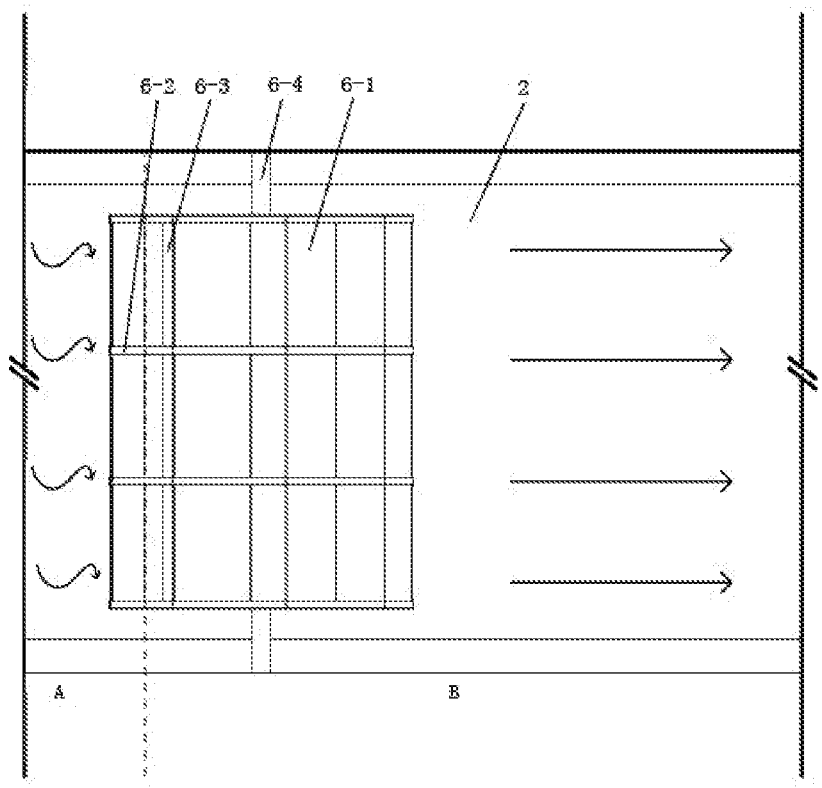
FIG. 3 is a structure diagram illustrating the boost straightening device of the flotation system for crushing, separating and washing waste plastics as shown in FIG. 1.
Figure 4:
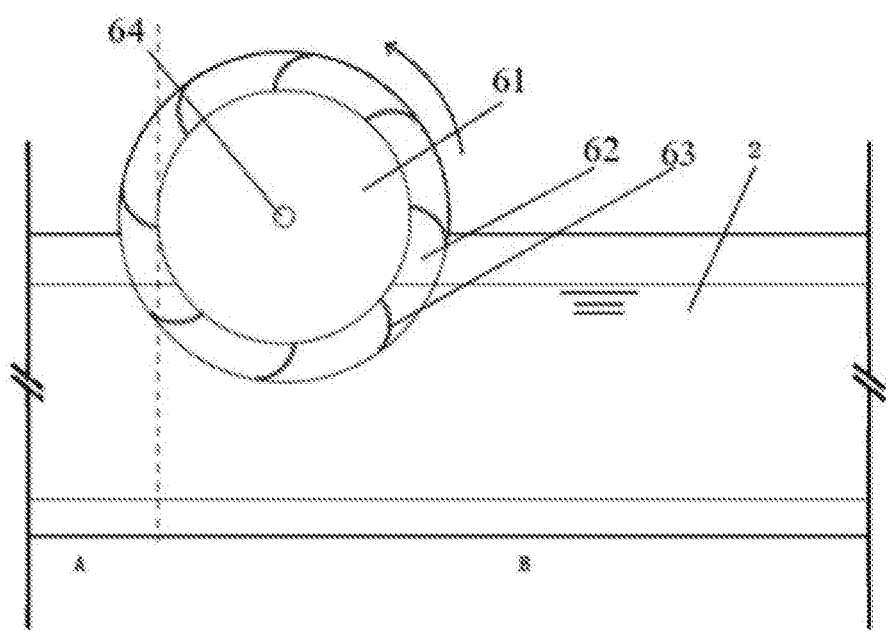
FIG. 4 is a structure diagram illustrating the radial-cross section of the boost straightening device as shown in FIG. 3.

As shown in FIG. 1, the flotation tank 2 and/or washing tank 4 are respectively equipped with boost straightening devices 6 with same structure;

As shown in FIG. 3 and FIG. 4, the boost straightening device 6 includes a straightening roller 61, radial diversion vanes 62 and axial diversion vanes 63; the radial diversion vanes and axial diversion vanes are cross distributed on the outer cylindrical surface of the straightening roller 61. The straightening roller 61 is a closed hollow cylinder with a roller rotating axle 64 disposed in the central part thereof, the radial diversion vane 62 is a vertical baffle radially disposed on the outer cylindrical surface of the straightening roller 61, and the axial diversion vane 63 is an arc-shaped baffle axially disposed on the outer cylindrical surface of the straightening roller 61. When using, simply install the boost straightening device 6 on the flotation tank 2 or the washing tank 4; the central axis of the boost straightening device 6 is perpendicular to the flow direction of the fluid in the flow channels, the quantity of boost straightening devices 6 can be set flexibly according to actual requirements. The working principle of the boost straightening device 6 herein is as follows: when the straightening roller 61 is rotating, the lowest point of the outer cylindrical surface is lower than the fluid surface in the flow channels, therefore, the fluid and fragments of waste plastics contained therein will be pushed downwards to a certain water level, so as to reduce the rising distance of the floating materials and the settling distance of the sinking materials; wherein, the function of the axial diversion vanes distributed on the straightening roller is to push materials downwards, so that the materials will not billow out but will flow smoothly with the fluid medium; the function of the radial diversion vanes distributed on the straightening roller is to convert the fluid flow from the status of turbulent flow to the status of plug flow, thereby avoiding the materials going up and down with the fluid medium. Wherein, the direction of the fluid flow is as shown in arrows in FIG. 3, the area A in front of the boost straightening device 6 forms a turbulent flow area, and the area in the rear of the boost straightening device 6 forms a plug flow area.

As shown in FIG. 1, the flotation tank 2 and/or washing tank 4 are equipped with beaters 7 with same structure;

The beater 7 includes a beater rotating axle and multiple rotating blades, the multiple rotating blades are uniformly distributed on the outer cylindrical surface of the beater rotating axle, and each of rotating blades is disposed axially along the central axis of the beater rotating axle. When using, simply install the beater 7 on the flotation tank 2 or the washing tank 4; the central axis of the beater 7 is perpendicular to the direction of the fluid flow in the flow channels, the quantity of the beaters 7 also can be set flexibly according to actual requirements. When the beater 7 is working, the rotating axle of the beater 7 drives rotating blades to rotate, flapping materials in the flotation tank 2 or the washing tank 4, thereby accelerating the separating speed of the materials in the fluid medium.

As shown in FIG. 1, the crusher 1 and the feeding port of the flotation tank 2 are connected through a screw conveyor 8.

Figure 6:
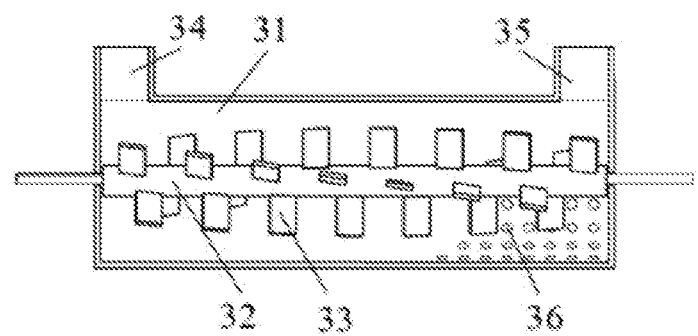
FIG. 6 is a structure diagram illustrating the multi-functional rubbing and separating device of the flotation system for crushing, separating and washing waste plastics as shown in FIG. 1.

As shown in FIG. 6, the multi-functional rubbing and separating device 3 includes a main body 31, a rotating axle 32 and lapping blades 33; a feeding port 34 is disposed on one end of the main body 31 and a discharge port 35 is disposed on the other end, the rotating axle 32 and lapping blades 33 are disposed inside the main body 31, and the lapping blades 33 are distributed on the outer cylindrical surface of the rotating axle 32; inner space of the main body 31 close to the feeding port 34 forms a rubbing section, and inner space close to the discharge port 35 forms a separating and dehydrating section; the main body 31 is a hollow cylinder with both ends closed, and there are multiple through-holes 36 distributed on the sidewall of the main body 31. The external rotary driving mechanism, connected to the multi-functional rubbing and separating device, drives the rotating axle 32 to drive the lapping blades 33 to rotate at a high speed, after the materials, containing waste plastics and fluid medium which may be water and saline and so on, are transported into the main body 31 from the feeding port 34, along with the high-speed revolution of the lapping blades 33, the impurities attaching on the surface of the waste plastics are separated preliminarily in the rubbing section, and in the separating dehydration section, after the materials are flapped by the lapping blades 33, the impurities are thrown, along with the fluid medium, out of the main body 31 through through-holes 36. The waste plastics, because of the kinetic energy provided by the lapping blades 33, will bounce off the discharge port 35 of the multi-functional rubbing and separating device 3.

Figure 5A:
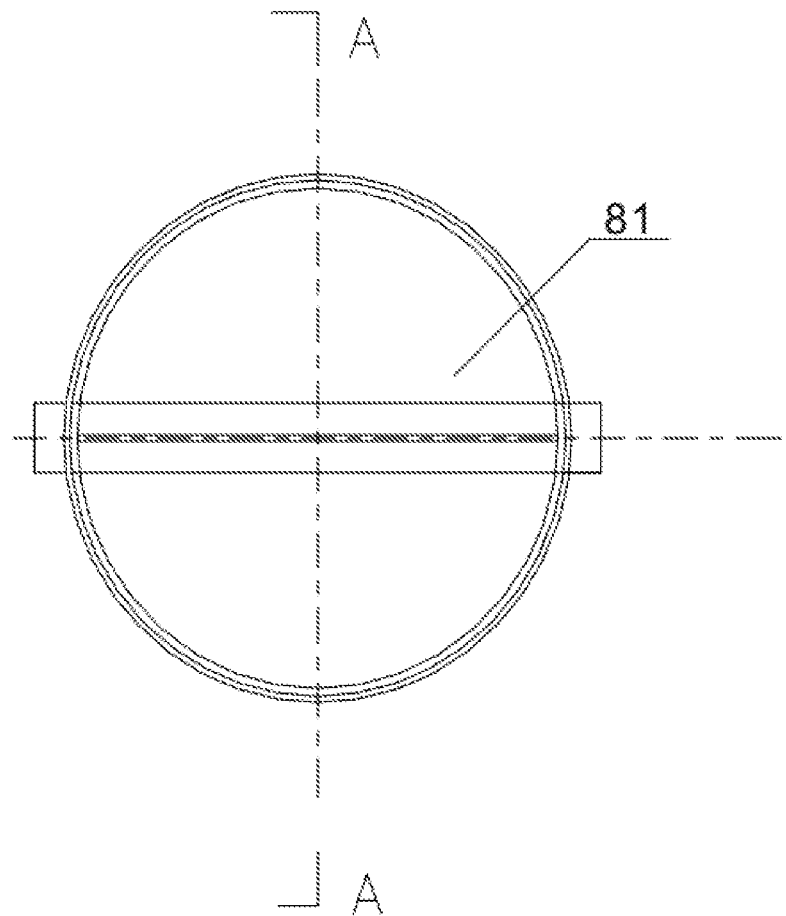
FIG. 5a is a structure diagram illustrating the material transporting pipe of the flotation system for crushing, separating and washing waste plastics as shown in FIG. 1.
Figure 5B:
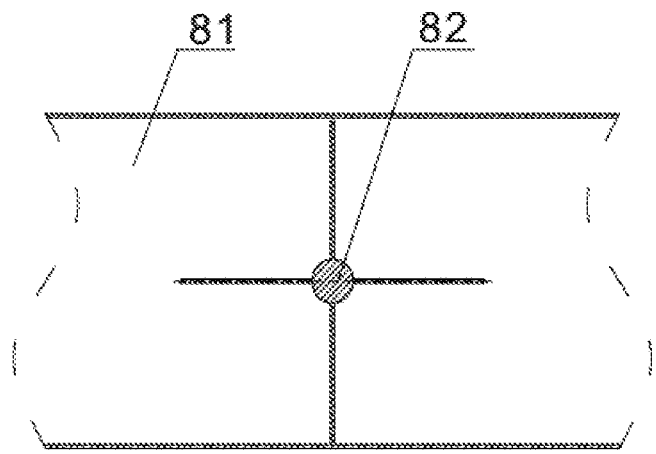
Figure 5C:
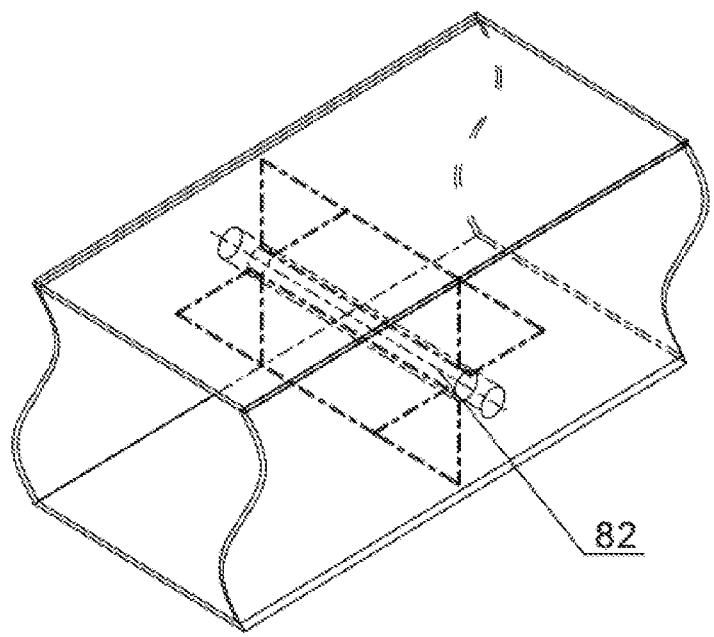
FIG. 5c is a structure diagram illustrating the material transporting trough of the flotation system for crushing, separating and washing waste plastics according to another embodiment of the present invention.

A material limiting device is disposed between the flotation tank 2 and the multi-functional rubbing and separating device 3. To be specific, the material limiting device includes a material transporting pipe 81 and an impeller 82; the material transporting pipe 81 (which may either be a material transporting trough) is disposed at the feeding port 34 of the multi-functional rubbing and separating device 3, the structure of the material transporting pipe 81 is shown in FIG. 5a, while the structure of the material transporting trough is shown in FIG. 5c; the impeller 82 is disposed inside the material transporting pipe 81, the axial central axis of the impeller 82 is perpendicular to the central axis of the material transporting pipe 81, and the central axle of the impeller 82 connects with an external impeller driving mechanism. Blades on the impeller 82 divide the cross-section of the material transporting pipe 81 into multiple relatively independent spaces; after being fed into the material transporting pipe 81, the materials are distributed, at the impeller 82, into every relatively independent spaces; along with rotation of the impeller 82, materials in every relatively independent spaces are transported into the feeding port 34 of the rubbing and separating device 3. Since the materials are fed into the feeding port 34 of the rubbing and separating device 3 uniformly in batches, the material feeding flow is uniform, thereby avoiding the multi-functional rubbing and separating device being blocked due to over-load materials.

The dehydrator 5 is a vertical dehydrator, and a cyclone separator is connected in the discharge port of the dehydrator 5.

Figure 7:
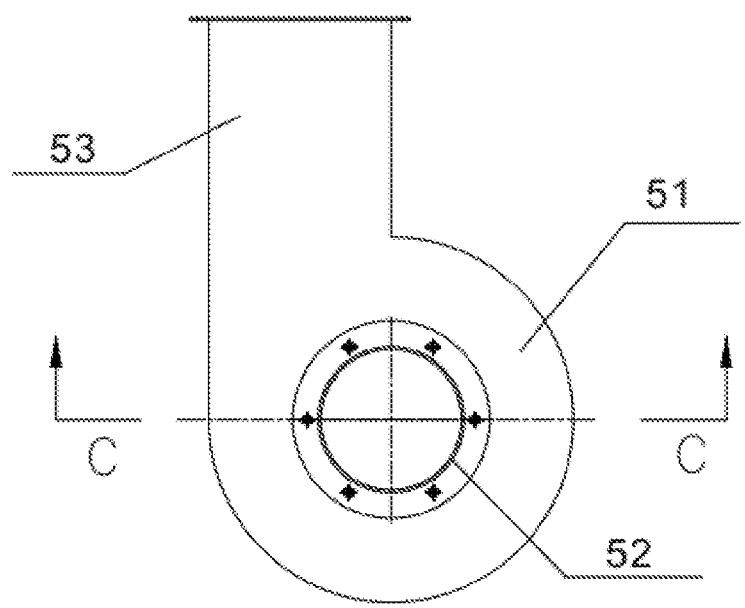
FIG. 7 is a structure diagram illustrating the cyclone separator in the dehydrator device of the flotation system for crushing, separating and washing waste plastics as shown in FIG. 1.
Figure 8:
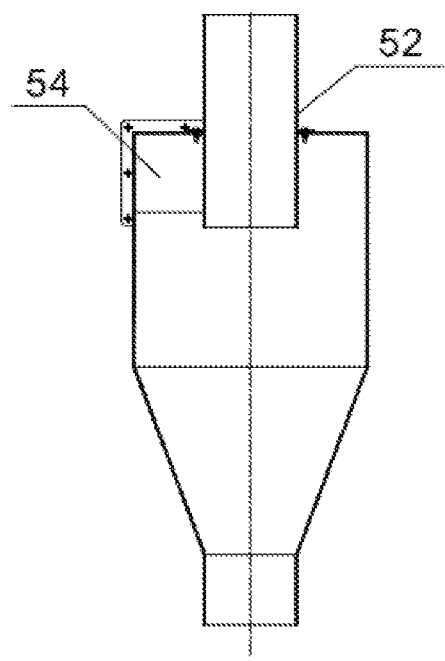
FIG. 8 is a cross-section view taken along C-C line of FIG. 7.

As shown in FIG. 7 and FIG. 8, the cyclone separator includes a rotary type cyclone separating body 51 and a discharge pipe 52 disposed on the top of the cyclone separating body 51 for discharging thin pieces; a material-air feeding pipe 53 connected to the discharge port of the dehydrator 5 is disposed on the upper part of the cyclone separating body 51, blowing direction of the material-air feeding pipe 53 is tangent to an inner wall of the cyclone separating body 51, and a material-air feeding port 54 is formed on a wall of the cyclone separating body 51; a discharge port for thick pieces is disposed on the bottom of the cyclone separating body 51; the discharge pipe 52 extends inside the cyclone separating body 51 from ahead cover of the cyclone separating body 51, and a lower end of the discharge pipe 52 extends downward below the material-air feeding port 54. The thick/thin pieces (namely the pieces of the waste plastics being dehydrated by the dehydrator 5) are fed, with high air volume, from the material-air feeding pipe 53 into the cyclone separating body 51 to rotate at a high-speed; the thick pieces with smaller specific surface area, due to a higher centrifugal force being generated, are thrown to the inner wall of the cyclone separating body 51, and as the effect of gravity, the thick pieces sliding down to the bottom of the cyclone separating body 51 are discharged out of the discharge port; the wind flow entering the cyclone separating body 51 is discharged from the discharge pipe 52 because of pressure difference, the thin pieces with larger specific surface area, overcoming the gravity due to the effect of wind force, are carried by the wind flow and discharged out of the discharge pipe 52, thereby achieving the effect of separating the thick pieces and thin pieces in the waste plastics, and collecting the thick pieces and thin pieces separately.

A first circulating water mechanism is disposed between the flotation tank 2 and multi-functional rubbing and separating device 3, and a second circulating water mechanism is disposed between the washing tank 4 and the dehydrator 5. The first circulating water mechanism includes a circulating pipe disposed between the flotation tank 2 and multi-functional rubbing and separating device 3, thereby, the flotation medium obtained after the processing by the multi-functional rubbing and separating device 3 is conveyed back to the flotation tank 2 for recycling utilization; the second circulating water mechanism includes a circulating pipe disposed between the washing tank 4 and the dehydrator 5, thereby, the washing medium obtained after the processing by the dehydrator 5 is conveyed back to the washing tank 4 for recycling utilization. By means of applying the first circulating water mechanism and the second circulating water mechanism, the high quality control of the fluid medium is realized, which is capable of effectively reducing the consumption and wastage of the flotation medium and washing medium in the crushing, separating and washing processes for the waste plastics.

By means of the system mentioned above, a flotation method for crushing, separating and washing waste plastics is realized, which includes following steps:

(1) Waste plastics are transported into the crusher 1 to be crushed, so as to form fragments of the waste plastics which are transported to the flotation tank 2;

(2) There is fluid flotation medium pre-placed in the flotation tank 2, and after being fed into the flotation tank 2, the fragments of the waste plastics are separated primarily along with the flowing of the flotation medium, thereby removing heavy impurities;

Those fragments of waste plastics, of which specific gravity is less than the specific gravity of the flotation medium, float upward and are transported to the multi-functional rubbing and separating device 3; while those fragments of waste plastics, of which specific gravity is heavier than the specific gravity of the flotation medium, and heavy impurities sink downward and remain in the flotation tank 2;

(3) After being fed to the multi-functional rubbing and separating device 3, the fragments of waste plastics are beaten and stirred by force for separation, thereby removing light impurities preliminarily, and then the pieces separated are transported to the washing tank 4;

(4) There is fluid washing medium pre-placed in the washing tank 4, and after being fed into the washing tank 4, the pieces of the waste plastics are secondarily separated along with the flowing of the washing medium, thereby further removing light impurities;

Those pieces of waste plastics, of which specific gravity is less than the specific gravity of the washing medium, float upward and are transported to the dehydrator 5; while those pieces of waste plastics, of which specific gravity is heavier than the specific gravity of the washing medium, and light impurities sink downward and remain in the washing tank 4; and (5) The pieces of the waste plastics are fed into the dehydrator 5 to be dried and dehydrated, so as to remove the washing medium attaching to the surface thereof, thereby forming recycled pieces.

In the step (1), the crusher 1 crushes the waste plastics by means of dry-crushing or wet-crushing; wherein the dry-crushing is performed by crushing the waste plastics directly by the crusher 1 without adding any fluid medium; and the wet-crushing is performed by crushing the waste plastics in a fluid medium environment by the crusher 1 with the fluid medium added into the crusher 1 simultaneously when the waste plastics are fed into the crusher 1;

In the step (2), the heavy impurities include metals and sediments contained in the fragments of the waste plastics, and the flotation medium is water or halide salt water;

And in the step (4), the light impurities include label paper, greasy dirt and flotation medium attaching on the surface of the waste plastics; and the washing medium is water or halide salt water;

The flotation medium and the washing medium, which generally are different kinds of fluid medium, can be converted to each other; and In the step (5), when there is a cyclone separator connected to the dehydrator, pieces of waste plastics form recycling pieces by dehydration in advance, and then pass the cyclone separator to separate thick pieces and thin pieces which are collected respectively.

It should be understood by those skilled in the art that what described above are preferred embodiments of the present disclosure. Various modifications and replacements may be made therein without departing from the theory of the present disclosure, which should also be seen in the scope of the present disclosure.

What is claimed is:

1. A flotation system for crushing, separating and washing waste plastics, in a direction of transporting materials, comprising a crusher, a flotation tank, a multi-functional rubbing and separating device, a washing tank and a dehydrator which are connected in turn;

wherein said flotation tank and said washing tank are disposed abreast;

said flotation tank is a straight launder;

said washing tank comprises a tank-body and a division plate; the tank-body is a U-shaped box, one end of the tank-body is a curve end, and the other end of the tank-body is a flat end, and the division plate is disposed at an intermediate position inside the tank-body; one end of the division plate is fixedly connected to the flat end of the tank-body, and a third flow channel is disposed between the other end of the division plate and the curve end of the tank-body, so that a first flow channel on one side of the division plate, a second flow channel on the other side of the division plate and the third flow channel form a continuous U-shaped washing flow channel; and a feeding port of said washing tank and a discharge port of said washing tank are disposed on said flat end of said tank-body;

a discharge port of said flotation tank is disposed on one end of said flotation tank approximate to said flat end of said tank-body, the feeding port of said flotation tank is disposed on another end of said flotation tank; the discharge port of said flotation tank and the feeding port of said washing tank are connected via said multi-functional rubbing and separating device; the feeding port of said flotation tank connects with said crusher, and the discharge port of said washing tank connects with said dehydrator.

2. The flotation system for crushing, separating and washing waste plastics according to claim 1, wherein, said flotation tank and/or washing tank are respectively equipped with at least one boost straightening device;

wherein said boost straightening device includes a straightening roller, radial diversion vanes and axial diversion vanes; said radial diversion vanes and axial diversion vanes are cross distributed on an outer cylindrical surface of said straightening roller; wherein, said straightening roller is a closed hollow cylinder with a roller rotating axle disposed in a central part thereof, said radial diversion vane is a vertical baffle radially disposed on the outer cylindrical surface of said straightening roller, and said axial diversion vane is an arc-shaped baffle axially disposed on the outer cylindrical surface of said straightening roller.

3. The flotation system for crushing, separating and washing waste plastics according to claim 1, wherein, said flotation tank and/or washing tank are respectively equipped with at least one beater;
wherein said beater includes a beater rotating axle and multiple rotating blades, said multiple rotating blades are uniformly distributed on an outer cylindrical surface of said beater rotating axle, and each of rotating blades is disposed axially along a central axis of said beater rotating axle.

4. The flotation system for crushing, separating and washing waste plastics according to claim 1, wherein, said multi-functional rubbing and separating device includes a main body, a rotating axle and lapping blades; a feeding port is disposed on one end of the main body and a discharge port is disposed on another end; said rotating axle and lapping blades are disposed inside the main body; and the lapping blades are distributed on outer cylindrical surface of said rotating axle; inner space of the main body close to the feeding port forms a rubbing section, and inner space close to the discharge port forms a separating and dehydrating section; said main body is a hollow cylinder with both ends closed, and there are multiple through-holes distributed on a sidewall of said main body.

5. The flotation system for crushing, separating and washing waste plastics according to claim 4, wherein, a material limiting device is disposed between said flotation tank and said multi-functional rubbing and separating device, to be specific, said material limiting device comprises a material transporting pipe and an impeller; said material transporting pipe is disposed at the feeding port of said multi-functional rubbing and separating device, said impeller is disposed inside said material transporting pipe, an axial central axis of said impeller is perpendicular to the central axis of said material transporting pipe, and a central axle of said impeller is adapted to be connected with an external impeller driving mechanism.

6. The flotation system for crushing, separating and washing waste plastics according to claim 1, wherein, said dehydrator is a vertical dehydrator; and a cyclone separator is connected in a discharge port of the dehydrator;
said cyclone separator comprises a rotary cyclone separating body and a discharge pipe disposed on a top of said cyclone separating body for discharging thin pieces; a material-air feeding pipe connected to the discharge port of said dehydrator is disposed on an upper part of said cyclone separating body, blowing direction of said material-air feeding pipe is tangent to an inner wall of said cyclone separating body, and a material-air feeding port is formed on a wall of said cyclone separating body; a discharge port for thick pieces is disposed on a bottom of said cyclone separating body; the discharge pipe extends inside the cyclone separating body from a head cover of the cyclone separating body, and a lower end of said discharge pipe extends downward below the material-air feeding port.

7. A flotation method for crushing, separating and washing waste plastics, using the flotation system for crushing, separating and washing waste plastics according to claim 1, said flotation method comprises following steps:

(1) transporting the waste plastics into the crusher of the flotation system to be crushed, thereby forming fragments of the waste plastics, and then transporting the fragments of the waste plastics to the flotation tank of the flotation system;

(2) primarily separating the fragments of the waste plastics fed into the flotation tank along with flowing of the flotation medium pre-placed in the flotation tank, thereby removing heavy impurities; transporting upward floated fragments of waste plastics having a specific gravity less than a specific gravity of the flotation medium, to the multi-functional rubbing and separating device of the flotation system; retaining downward sunk fragments of waste plastics, having a specific gravity greater than the specific gravity of the flotation medium, along with the removed heavy impurities in the flotation tank;

(3) beating and stirring the fragments of waste plastics fed to the multi-functional rubbing and separating device by force for separation, thereby removing light impurities preliminarily, and then transporting separated pieces to the washing tank of the flotation system;

(4) secondarily commingling the separated pieces of the waste plastics fed into the washing tank along with washing medium pre-placed in the washing tank, thereby further removing light impurities; transporting upward floated pieces of waste plastics, having a specific gravity less than specific gravity of the washing medium, to the dehydrator of the flotation system; and retaining downward sunk pieces of waste plastics having a specific gravity greater than a specific gravity of the washing medium, along with light impurities in the washing tank; and (5) drying and dehydrating the pieces of the waste plastics fed into the dehydrator, and removing washing medium attaching to surfaces thereof, thereby forming recycled pieces.

8. The flotation method for crushing, separating and washing waste plastics according to claim 7, wherein, in the step (1), said crusher crushes the waste plastics by means of dry-crushing or wet-crushing; wherein the dry-crushing is performed by crushing the waste plastics directly by the crusher without adding any fluid medium; and the wet-crushing is performed by crushing the waste plastics in a fluid medium environment by the crusher with the fluid medium added into the crusher simultaneously when the waste plastics are fed into the crusher;
in the step (2), the heavy impurities include metals and sediments contained in the fragments of the waste plastics, and the flotation medium is water or halide salt water;
and in the step (4), the light impurities include label paper, greasy dirt and flotation medium attaching on surface of the waste plastics; and the washing medium is water or halide salt water.

9. A flotation method for crushing, separating and washing waste plastics, using the flotation system for crushing, separating and washing waste plastics according to claim 2, said flotation method comprises following steps:

(1) transporting the waste plastics into the crusher of the flotation system to be crushed, thereby forming fragments of the waste plastics, and then transporting the fragments of the waste plastics to the flotation tank of the flotation system;

(2) primarily separating the fragments of the waste plastics fed into the flotation tank along with flowing of the flotation medium pre-placed in the flotation tank, thereby removing heavy impurities; transporting upward floated fragments of waste plastics, having a specific gravity less than specific gravity of the flotation medium, to the multi-functional rubbing and separating device of the flotation system; retaining downward sunk fragments of waste plastics, having a specific gravity greater than the specific gravity of the flotation medium, along with removed heavy impurities in the flotation tank;

(3) beating and stirring the fragments of waste plastics fed to the multi-functional rubbing and separating device by force for separation, thereby removing light impurities preliminarily, and then transporting separated pieces to the washing tank of the flotation system;

(4) secondarily commingling the separated pieces of the waste plastics fed into the washing tank with washing medium pre-placed in the washing tank, thereby further removing light impurities; wherein transporting upward floated fragments of waste plastics, having a specific gravity less than specific gravity of the washing medium to the dehydrator of the flotation system; while retaining downward sunk pieces of waste plastics, having a specific gravity greater than a specific gravity of the washing medium, along with removed light impurities in the washing tank; and (5) drying and dehydrating the pieces of the waste plastics fed into the dehydrator, and then removing washing medium attaching to surfaces thereof, thereby forming recycled pieces.

10. The flotation method for crushing, separating and washing waste plastics according to claim 9, wherein, in the step (1), said crusher crushes the waste plastics by means of dry-crushing or wet-crushing; wherein the dry-crushing is performed by crushing the waste plastics directly by the crusher without adding any fluid medium; and the wet-crushing is performed by crushing the waste plastics in a fluid medium environment by the crusher with the fluid medium added into the crusher simultaneously when the waste plastics are fed into the crusher;

in the step (2), the heavy impurities include metals and sediments contained in the fragments of the waste plastics, and the flotation medium is water or halide salt water;

and in the step (4), the light impurities include label paper, greasy dirt and flotation medium attaching on surface of the waste plastics; and the washing medium is water or halide salt water.

11. A flotation method for crushing, separating and washing waste plastics, using the flotation system for crushing, separating and washing waste plastics according to claim 3, said flotation method comprises following steps:

(1) transporting the waste plastics into the crusher of the flotation system to be crushed, thereby forming fragments of the waste plastics, and then transporting the fragments of the waste plastics to the flotation tank of the flotation system;

(2) primarily separating the fragments of the waste plastics fed into the flotation tank, along with flowing of the flotation medium pre-placed in the flotation tank, thereby removing heavy impurities; wherein transporting upward floated fragments of waste plastics, having a specific gravity less than specific gravity of the flotation medium, to the multi-functional rubbing and separating device of the flotation system; while retaining downward sunk fragments of waste plastics, having a specific gravity greater than the specific gravity of the flotation medium, along with removed heavy impurities in the flotation tank;

(3) beating and stirring the fragments of waste plastics fed to the multi-functional rubbing and separating device by force for separation into separated pieces, thereby removing light impurities preliminarily, and then transporting the separated pieces to the washing tank of the flotation system;

(4) secondarily commingling the separated pieces of the waste plastics fed into the washing tank with washing medium pre-placed in the washing tank, thereby further removing light impurities; wherein transporting upward floated pieces of waste plastics, having a which specific gravity less than specific gravity of the washing medium to the dehydrator of the flotation system; while retaining downward sunk pieces of waste plastics, having a specific gravity greater than specific gravity of the washing medium, along with removed light impurities in the washing tank; and (5) drying and dehydrating the pieces of the waste plastics fed into the dehydrator, and then removing washing medium attaching to surfaces thereof, thereby forming recycled pieces.

12. The flotation method for crushing, separating and washing waste plastics according to claim 11, wherein, in the step (1), said crusher crushes the waste plastics by means of dry-crushing or wet-crushing; wherein the dry-crushing is performed by crushing the waste plastics directly by the crusher without adding any fluid medium; and the wet-crushing is performed by crushing the waste plastics in a fluid medium environment by the crusher with the fluid medium added into the crusher simultaneously when the waste plastics are fed into the crusher;

in the step (2), the heavy impurities include metals and sediments contained in the fragments of the waste plastics, and the flotation medium is water or halide salt water;

and in the step (4), the light impurities include label paper, greasy dirt and flotation medium attaching on surface of the waste plastics; and the washing medium is water or halide salt water.

13. A flotation method for crushing, separating and washing waste plastics, using the flotation system for crushing, separating and washing waste plastics according to claim 4, said flotation method comprises following steps:

(1) transporting the waste plastics into the crusher of the flotation system to be crushed, thereby forming fragments of the waste plastics, and then transporting the fragments of the waste plastics to the flotation tank of the flotation system;

(2) primarily separating the fragments of the waste plastics fed into the flotation tank along with flowing of the flotation medium pre-placed in the flotation tank, thereby removing heavy impurities; wherein transporting upward floated fragments of waste plastics, having a specific gravity less than specific gravity of the flotation medium, to the multi-functional rubbing and separating device of the flotation system; while retaining downward sunk fragments of waste plastics, having a specific gravity greater than a specific gravity of the flotation medium, along with removed heavy impurities in the flotation tank;

(3) beating and stirring the fragments of waste plastic fed to the multi-functional rubbing and separating device by force for separation, thereby removing light impurities preliminarily, and then transporting separated pieces to the washing tank of the flotation system;
(4) secondarily commingling the separated pieces of the waste plastics fed into the washing tank with washing medium pre-placed in the washing tank, thereby further removing light impurities; wherein transporting upward floated pieces of waste plastics, having a specific gravity less than a specific gravity of the washing medium, to the dehydrator of the flotation system; while retaining downward sunk pieces of waste plastics, having a specific gravity greater than a specific gravity of the washing medium, along with removed light impurities in the washing tank; and
(5) drying and dehydrating the pieces of the waste plastics fed into the dehydrator, and then removing washing medium attaching to surfaces thereof, thereby forming recycled pieces.

14. A flotation method for crushing, separating and washing waste plastics, using the flotation system for crushing, separating and washing waste plastics according to claim 5, said flotation method comprises following steps:
(1) transporting the waste plastics into the crusher of the flotation system to be crushed, thereby forming fragments of the waste plastics, and then transporting the fragments of the waste plastics to the flotation tank of the flotation system;
(2) primarily separating the fragments of the waste plastics fed into the flotation tank along with flowing of the flotation medium pre-placed in the flotation tank, thereby removing heavy impurities; wherein transporting upward floated fragments of waste plastics, having a specific gravity less than specific gravity of the flotation medium, to the multi-functional rubbing and separating device of the flotation system; while retaining downward sunk fragments of waste plastics, having a specific gravity greater than the specific gravity of the flotation medium, along with removed heavy impurities in the flotation tank;
(3) beating and stirring the fragments of waste plastics fed to the multi-functional rubbing and separating device by force for separation into separated pieces, thereby removing light impurities preliminarily, and then transporting the separated pieces to the washing tank of the flotation system;
(4) secondarily commingling the separated pieces of the waste plastics fed into the washing tank with washing medium pre-placed in the washing tank, thereby further removing light impurities; wherein transporting upward floated pieces of waste plastics, having a specific gravity is less than a specific gravity of the washing medium, to the dehydrator of the flotation system; while retaining downward sunk pieces of waste plastics, having a specific gravity greater than a specific gravity of the washing medium, along with removed light impurities in the washing tank; and
(5) drying and dehydrating the pieces of the waste plastics fed into the dehydrator, and then removing washing medium attaching to surfaces thereof, thereby forming recycled pieces.

15. A flotation method for crushing, separating and washing waste plastics, using the flotation system for crushing, separating and washing waste plastics according to claim 6, said flotation method comprises following steps:
(1) transporting the waste plastics into the crusher of the flotation system to be crushed, thereby forming fragments of the waste plastics, and then transporting the fragments of the waste plastics to the flotation tank of the flotation system;
(2) primarily separating the fragments of the waste plastics fed into the flotation tank along with flowing of the flotation medium pre-placed in the flotation tank, thereby removing heavy impurities; wherein transporting upward floated fragments of waste plastics, having a specific gravity less than specific gravity of the flotation medium, to the multi-functional rubbing and separating device of the flotation system; while retaining downward sunk fragments of waste plastics, having a specific gravity greater than the specific gravity of the flotation medium, along with removed heavy impurities in the flotation tank;
(3) beating and stirring the fragments of waste plastics fed to the multi-functional rubbing and separating device by force for separation, thereby removing light impurities preliminarily, and then transporting separated pieces to the washing tank of the flotation system;
(4) commingling the separated pieces of the waste plastics fed into the washing tank with washing medium pre-placed in the washing tank, thereby further removing light impurities; wherein transporting the floated upward pieces of waste plastics, having a specific gravity less than a specific gravity of the washing medium, to the dehydrator of the flotation system; while retaining downward sunk pieces of waste plastics, having a specific gravity greater than a specific gravity of the washing medium, along with removed light impurities in the washing tank; and
(5) drying and dehydrating the pieces of the waste plastics fed into the dehydrator, and then removing washing medium attaching to surfaces thereof, thereby forming recycled pieces.

\* \* \* \* \*